United States Patent Office 2,759,946
Patented Aug. 21, 1956

2,759,946
PYRIDINE GLYCOLS AND PROCESS OF MAKING THEM

Francis E. Cislak and Charles K. McGill, Indianapolis, Ind., assignors to Reilly Tar & Chemical Corporation, Indianapolis, Ind., a corporation of Indiana No Drawing. Application February 15, 1956, Serial No. 565,545

12 Claims. (Cl. 260—297)

This invention relates to pyridine glycols and to the process of making them. More particularly, it relates to pyridine glycols having the following general formula:

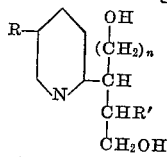

where $n$ is 1 or 2 and R and R' are hydrogen or lower alkyl.

In general, the compounds of our invention may be prepared by reacting sodamide with a pyridine which has as a substituent the alkanol group $-(CH_2)_n \cdot CH_2OH$ (wherein $n$ represents 1 or 2) and then reacting the resulting sodiopyridine with an ethylene oxide of the formula

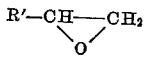

where R' is hydrogen or lower alkyl.

Our invention will be described more fully in conjunction with the following specific examples. It should be understood, however, that these examples are given by way of illustration only and the invention is not to be limited by the details set forth therein.

EXAMPLE 1
4-(3-pentan-1:5-diol)pyridine

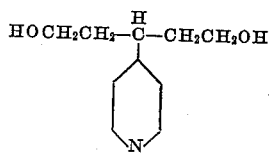

Seventy-eight grams (2 mols) of finely divided sodamide, prepared in any suitable manner, are dispersed in about 2000 cc. of liquid ammonia. To this dispersion of sodamide in liquid ammonia is added about 137 grams (1 mol) of 4-(1-propan-3-ol)pyridine; the latter compound is added in small portions to more readily control the reaction. After all of the 4-(1-propan-3-ol)pyridine has been added, the mixture is stirred for about another one-half to one hour. Then about 50 grams (1 mol) of ethylene oxide is added in small portions. The reaction mixture is mechanically stirred during the addition of the ethylene oxide; the stirring is continued for from two to six hours after all the ethylene oxide has been added. The 4-(3-pentan-1:5-diol)pyridine formed during the reaction period is isolated in any suitable manner.

One way of isolating the 4-(3-pentan-1:5-diol) pyridine is as follows: The ammonia is evaporated. Methanol and then water are added to hydrolyse any unreacted sodamide, and the sodium derivative of the diol. Then 4-picoline is added and the mixture thoroughly agitated. Upon settling, two layers are formed, a caustic aqueous layer and the 4-picoline layer containing the 4-(3-pentan-1:5-diol)pyridine. Some of the caustic aqueous layer is also dissolved in the 4-picoline layer; this is neutralized as with carbon dioxide. The 4-picoline, any unreacted 4-(1-propan-3-ol)pyridine, and the 4-(3-pentan-1:5-diol)pyridine are separated from each other by fractional distillation under vacuum.

The 4-(3-pentan-1:5-diol)pyridine boils at about 200° C. at about 5 mm. Hg pressure and freezes at about 36° C. It is reluctant to crystallize even at Dry Ice temperatures but may be caused to crystallize.

The reaction in liquid ammonia may be carried out at atmospheric pressure or it may be conducted at super-atmospheric pressure. Commercially, we prefer to use super-atmospheric pressure in the order of 100–200 lbs./sq. in.

We have found it advantageous to react the 4-(1-propan-3-ol)pyridine with the sodamide at a low temperature, even as low as −30° C. Usually we carry out the reaction at about room temperature.

While we prefer to use liquid ammonia as our reaction medium, we can use other media, such as dimethylaniline, diethylether, or the like.

We prefer to use about 2 mols of sodamide per mole of the alkanolpyridine. A small ratio of sodamide to alkanol-pyridine results in a lower yield.

EXAMPLE 2
2-(3-butan-1:4-diol)pyridine

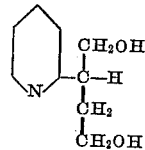

The procedure of Example 1 is followed except that in place of the 4-(1-propan-3-ol)pyridine we used one mole of 2-(1-ethan-2-ol)pyridine.

EXAMPLE 3
3-(3-pentan-1:5-diol)pyridine

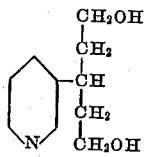

The procedure of Example 1 is followed except that in place of 4-(1-propan-3-ol)pyridine, we use one mol of 3-(1-propan-3-ol)pyridine.

EXAMPLE 4
2-(3-butan-1:4-diol)-5-ethylpyridine

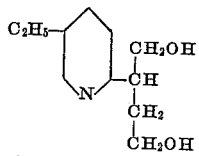

The procedure of Example 1 is followed except that in place of the 4-(1-propan-3-ol)pyridine, we use one mol of 2-(1-ethan-2-ol)-5-ethylpyridine.

EXAMPLE 5
2-(3-pentan-1:5-diol)pyridine

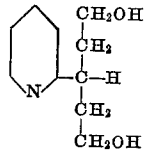

The procedure of Example 1 is followed except that in place of the 4-(1-propan-3-ol)pyridine, we use one mol of 2-(1-propan-3-ol)pyridine.

The pyridylglycols of our invention are difunctional alcohols. They have the chemical properties associated with alcohols and are capable of entering into the same type of reactions as other primary difunctional alcohols, within the limitations imposed by the pyridine nucleus. They are water-soluble and possess a very low volatility.

Our pyridylglycols can be reacted, for example, with alkylhalides, to form pyridinium quaternaries. These pyridine quaternary type salts act as cationic detergents.

Of the many reactions possible with the pyridylglycols, for example, etherification, halogenation, hydrogenation, those of most commercial significance are esterification and polymerization. The pyridylglycols are good raw materials from which to make resins.

The pyridylglycols of our invention are useful in the manufacture of certain types of synthetic fibers. One of the newer and more acceptable synthetic fibers, dacron, is a polyester of terephthalic acid and ethylene glycol. The dyeing of dacron type fibers has not heretofore been solved. Attempts have been made to achieve the penetration of the closely packed molecular chains by the use of the carriers, by dyeing at high temperatures, or by forming the final dye molecule within the fiber. By the use of a small percentage (3% to 7%) of pyridylglycols in the molecular make-up of the polyesters, the dyeing properties are greatly enhanced. The presence of the pyridine ring nitrogen in the resin molecule furnishes a point of attachment for acid dyes, thereby enabling the fibers to be dyed in the usual manner. The degree of the dye absorption depends upon the number of pyridine ring nitrogens present in the resin molecule. The use of the pyridylglycols in the molecular make-up of polyester resins increases the bond of these resins to the glass fibers commonly used for reinforcement of the polyesters.

For reasons of economy we prefer to use sodamide in the preparation of the pyridylglycols. We can, however, use any of the other alkali amides. We may, for example, use potassium amide.

We claim as our invention:

1. Compounds of the class consisting of pyridylglycols having the following general formula:

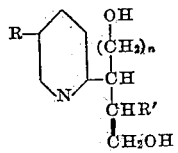

where $n$ is 1 to 2 and R and R' are selected from the class consisting of hydrogen and lower alkyl.

2. The compound 4-(3-pentan-1:5-diol)pyridine.
3. The compound 2-(3-butan-1:4-diol)pyridine.
4. The compound 3-(3-pentan-1:5-diol)pyridine.
5. The compound 2-(3-butan-1:4-diol)pyridine.
6. The compound 2-(3-pentan-1:5-diol)pyridine.
7. The process of preparing compounds of the class consisting of pyridylglycols having the following general formula:

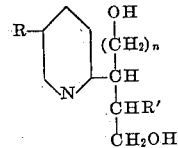

where $n$ is 1 to 2 and R and R' are selected from the class consisting of hydrogen and lower alkyl, which comprises reacting 2 mols sodamide with 1 mol pyridine which has as a substituent the alkanol group —$(CH_2)_n \cdot CH_2OH$ where $n$ is 1 to 2, and then reacting the resulting compound with an ethylene oxide.

8. The process of preparing the compound of claim 2 which comprises reacting 2 mols sodamide with 1 mol 4-(1-propan-3-ol)pyridine and then reacting the resulting compound with ethylene oxide.

9. The process of preparing the compound of claim 3 which comprises reacting 2 mols sodamide with 1 mol 2-(1-ethan-2-ol)pyridine and then reacting the resulting compound with ethylene oxide.

10. The process of preparing the compound of claim 4 which comprises reacting 2 mols sodamide with 1 mol 3-(1-propan-3-ol)pyridine and then reacting the resulting compound with ethylene oxide.

11. The process of preparing the compound of claim 5 which comprises reacting 2 mols sodamide with 1 mol 2-(1-ethan-3-ol)-5-ethylpyridine and then reacting the resulting compound with ethylene oxide.

12. The process of preparing the compound of claim 6 which comprises reacting 2 mols sodamide with 1 mol 2-(1-propan-3-ol)pyridine and then reacting the resulting compound with ethylene oxide.

References Cited in the file of this patent

UNITED STATES PATENTS

| 2,512,660 | Mahan | June 27, 1950 |
| 2,698,848 | Mahan | Jan. 4, 1955 |

OTHER REFERENCES

Seide: Ber. Deut. Chem., vol 57, pp. 791–2 (1924).
Grunwold: Chem. Abst., vol. 38, col. 6197 (1944).
Schick et al.: J. Am. Chem. Soc., vol. 42, col. 7288 (1948).
Gilman et al.: Rec. Trav. Chim., vol. 69, pp. 428–32 (1950).